United States Patent [19]

Bernard et al.

[11] Patent Number: 4,758,249

[45] Date of Patent: Jul. 19, 1988

[54] HYDROGEN REDUCTION OF CARBONACEOUS SOURCE TO FORM CARBON MONOXIDE

[75] Inventors: Philippe Bernard, Paris; Francois Prudhon, Versailles, both of France

[73] Assignee: Rhone-Poulenc Chimie de Base, Courbevoie, France

[21] Appl. No.: 4,246

[22] Filed: Jan. 5, 1987

Related U.S. Application Data

[63] Continuation of Ser. No. 612,473, May 21, 1984, abandoned.

[30] Foreign Application Priority Data

May 20, 1983 [FR] France .................... 83 08392

[51] Int. Cl.⁴ .................... C01B 31/18; C10J 3/46
[52] U.S. Cl. .................... 48/197 R; 48/203; 423/415 A
[58] Field of Search .................... 48/197 R, 202, 203, 48/206, 210; 423/415 A; 252/373

[56] References Cited

U.S. PATENT DOCUMENTS

| | | | |
|---|---|---|---|
| 1,719,867 | 7/1929 | Arsem | 423/415 R |
| 1,740,139 | 12/1929 | Arsem | 422/199 |
| 2,777,813 | 1/1957 | Totzik | 423/415 A |
| 3,479,149 | 11/1969 | Trilette | 423/415 A |
| 3,850,588 | 11/1974 | White | 423/415 A X |
| 3,868,817 | 3/1975 | Marion et al. | 252/373 |
| 3,943,236 | 3/1976 | Green | 48/197 R X |
| 4,040,976 | 8/1977 | Greene | 252/373 |
| 4,042,344 | 8/1977 | Callcott et al. | 48/197 R |
| 4,265,868 | 5/1981 | Kamody | 423/415 A |

FOREIGN PATENT DOCUMENTS

| | | | |
|---|---|---|---|
| 326227 | 3/1930 | United Kingdom | 423/415 A |
| 521415 | 5/1940 | United Kingdom | 423/415 A |

*Primary Examiner*—Barry S. Richman
*Assistant Examiner*—Joye L. Woodard
*Attorney, Agent, or Firm*—Burns, Doane, Swecker & Mathis

[57] ABSTRACT

Carbon dioxide is facilely converted into carbon monoxide and water, and advantageously into a syngas, by establishing a thermally homogeneous gaseous admixture including carbon dioxide and hydrogen having a temperature of at least 800° C., within a period of time essentially insufficient for the production of carbon monoxide therefrom, and wherein said carbon dioxide is next autogenously reduced under reaction equilibrium conditions to carbon monoxide and water by reaction with hydrogen, with each molecule of carbon monoxide formed having, or essentially instantaneously being brought to, a temperature of at least 800° C.

15 Claims, 2 Drawing Sheets

HYDROGEN REDUCTION OF CARBONACEOUS SOURCE TO FORM CARBON MONOXIDE

This application is a continuation of application Ser. No. 612,473, filed May 21, 1984, now abandoned.

BACKGROUND OF THE INVENTION

1. Field of the Invention

The present invention relates to the production of carbon monoxide from a carbonaceous source by reduction with hydrogen, and, more especially, to the preparation of gaseous mixtures containing hydrogen and carbon monoxide. The invention also relates to apparatus for carrying out the subject process, and various other applications thereof.

2. Description of the Prior Art

It is known to this art that $H_2/CO$ mixtures are of considerable interest from commercial and technical points of view. Efforts have been made to produce such synthetic fuels for about the last three decades. However, these gaseous mixtures may also be useful in chemical processes such as the synthesis of ammonia, the synthesis of methanol, Fischer-Tropsch type syntheses, etc., as referred to in 1963, in U.S. Pat. No. 3,479,149.

Twenty years later, the attraction of such a transformation process has not decreased, but is quite to the contrary, both in the field of synthetic gases (also known as syngases), and in the field of synthetic fuels (known as synfuels). In fact, such reduction processing enables use of hydrogen, oxygen and $CO_2$, it being appreciated in particular that, in this fashion, it is possible to "store" energy in liquid form. This is very important for, at the present time, electrical energy cannot be conserved, or cannot be satisfactorily conserved. One method comprises electrolyzing water and recovering the hydrogen and the oxygen, and re-using these elements in a conversion operation which ultimately results in a fuel.

In spite of the considerable amount of work which has resulted in a substantial amount of literature and the filing and issuing of many patents, it has been recognized that the following reaction:

$$CO_2 + H_2 \rightarrow CO + H_2O$$

is generally carried out in a catalytic medium, for example, aluminosilicate (U.S. Pat. No. 3,479,149), ferric oxide (French Patent No. 2,295,118), Fe, Ni, Co and alloys thereof (published Japanese application No. 77/88,597), potassium carbonate (*CA*, Vol. 92, page 136, 92-166174j [1980]), and rhodium complexes (*CA*, Vol. 94, page 441, 94-128092q [1981]).

It has also been reported that an inert lining was sufficient for that reaction to be properly carried out (*Actualite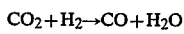Chimique*, January 1982, page 29). A plasma or a luminescent discharge too has been utilized (see, for example, *CA*, Vol. 87, page 135, 87-119989r [1977]).

By means of either of the aforesaid methods, by judicious selection among temperatures, pressures and the nature of the catalysts, it is possible to achieve the formation of hydrocarbons; see, for example, the above French Patent No. 2,295,118. It is also possible to prepare methane from $CO_2$ by luminescent discharge in the presence of Fe to produce carbon monoxide, and then by reduction of the CO in the presence of a catalyst comprising Co-$ZrO_2$MgO- kiesselghur, at 190° C., to give methane (*CA*, Vol. 90, page 537, 90-103291h [1979]).

The above review which is not intended as exhaustive reflects that the topic reduction operation is not an easy one to master. Even when using a burner at a temperature in excess of 600° C., a catalyst was used (*CA*, Vol. 90, page 140, 90-189269s [1979]).

It too is known that the rate of conversion of $CO_2$ to CO is low in the usual catalysis temperature range, irrespective of the mode of use of the catalyst (fixed bed, fluidized bed, entrained bed, etc.), that defect being accentuated in the case of a fluidized bed by virtue of short-circuiting because of the bubbles.

Under the circumstances, that disadvantage is in addition to the conventional deficiencies of the catalysts (resistance in respect of time to temperature and corrosion, impurities, cost, and the like).

It has also been proposed that the subject reaction may be carried out at a temperature of more than 800° C. in the presence of a chemically inert reactor lining (*Actualite Chimique*, January 1982, page 29).

However, such mode of operation suffers from a number of disadvantages:

(1) The chemically inert nature of the lining can be preserved only insofar as the reactants do not comprise any active substance which is liable to be deposited directly onto the liner and no active substance is formed over the course of any secondary reactions; and (2) In addition, the lining is homogenous in respect of temperature only insofar as it is heated by an equally distributed exothermic reaction. It is known that such a lining has both radial and longitudinal temperature profiles with hot spots towards the center and cooled regions in the vicinity of the periphery if the heat required is generated in situ, such temperature profiles being reversed in the case where heat is supplied through the walls thereof. The flow section corresponding to the annular regions which are close to the wall being very large, a large portion of the gas flow therefore takes place under temperature conditions which are different from those prevailing in the main volume of the apparatus, which corresponds to different states of kinetics in respect of the equilibria involved and possible secondary reactions as described below.

Moreover, the temperature profile mentioned above is particulary detrimental at the moment of start-up and more generally in any variation in operating manner, which may result in deposits of soot.

In fact, it is known that, at a temperature of less than 800° C., any CO which may be formed is degraded to form undesirable products (for example, carbon, by Boudouard reaction).

This implies that the reaction should be carried out at a temperature in excess of 800° C. and in a homogeneous gaseous phase. However, it has also been claimed that it is necessary for the operating temperature to exceed 1300° C., in order to establish an appreciable rate of evolution of equilibrium conditions. On the other hand, calculations evidence that, above a temperature on the order of 1200° C., the energy required for increasing the rate of conversion of $CO_2$ to CO becomes prohibitive, which detracts from the desirability of a process using a plasma or a luminescent discharge.

However, raising a gas to a temperature of more than 800° C. (and a fortiori to more than 1300° C.) by indirect heating gives rise to technological difficulties which are well known (hydrogen diffusion, and fatigue in and carburization of metal alloys, and the like) and presupposes providing a hot source at a temperature which is markedly higher than that of the gas (thermal efficiency and resistance of the materials involved).

It has been reasoned that the immediately above should direct attention in favor of reactors in which the products react and are transported solely in a gaseous phase, but among the problems which then arise, those encountered include contacting the reactants, and transferring mass and heat. The contacting of the reactants must be carried out by rapid mixing at very high temperatures in order to avoid local and transitory degradation. However, and in particular from a technological point of view, it is an attractive proposition to use a reactor of cooled wall type, namely, a reactor having sidewall temperature which is lower than the tolerances of conventional steels (800° C.), whereas the reaction temperature is generally much higher. Nonetheless, that reactor must not suffer from the aforementioned disadvantage, i.e., localized cooling of the gases by the reactor wall. It must therefore have a very low surface area/volume ratio (no lining) and must permit a high level of production per unit of volume.

In consequence, raising the mixture of the reactants to such temperatures very quickly and homogenously, in respect of temperature and composition, implies in situ generation of heat.

For that purpose, consideration has been given to use of rocket motor technology, by maintaining a boundary layer of unreacted hydrogen along the walls of the reaction zone. However, this is a contradiction in terms with respect to the requirements of a medium which is of maxium homogeneity.

An ideal reactor would consist of a reactor which has both relatively cold sidewall members and a reaction medium temperature identical to the theoretical temperature.

SUMMARY OF THE INVENTION

Accordingly, a major object of the present invention is the provision of an improved process for the production of carbon monoxide from a carbonaceous starting material, employing a reaction temperature ranging from 800° C. to 1300° C., while at the same time maintaining appreciable rates of attainment of reaction equilibrium.

The focus of the invention is in reducing $CO_2$ to CO by means of hydrogen, by ensuring that every molecule of CO formed has a temperature in excess of 800° C. or is rapidly raised to more than 800° C.

Briefly according to this invention, a carbonaceous source, hydrogen and oxygen are introduced into a first reaction zone A which, by in situ combustion, is brought to a temperature of at least 800° C., advantageously from 800° C. to 1300° C., while avoiding the formation of carbon monoxide at a temperature below 800° C., and thereafter effecting an abrupt cooling in a second zone B by the introduction of cold fluid such as to inhibit any change in the equilibrium composition in said zone B and therefore maintain the gases at the composition existing at the outlet of the zone A.

DETAILED DESCRIPTION OF THE INVENTION

Figure 1:
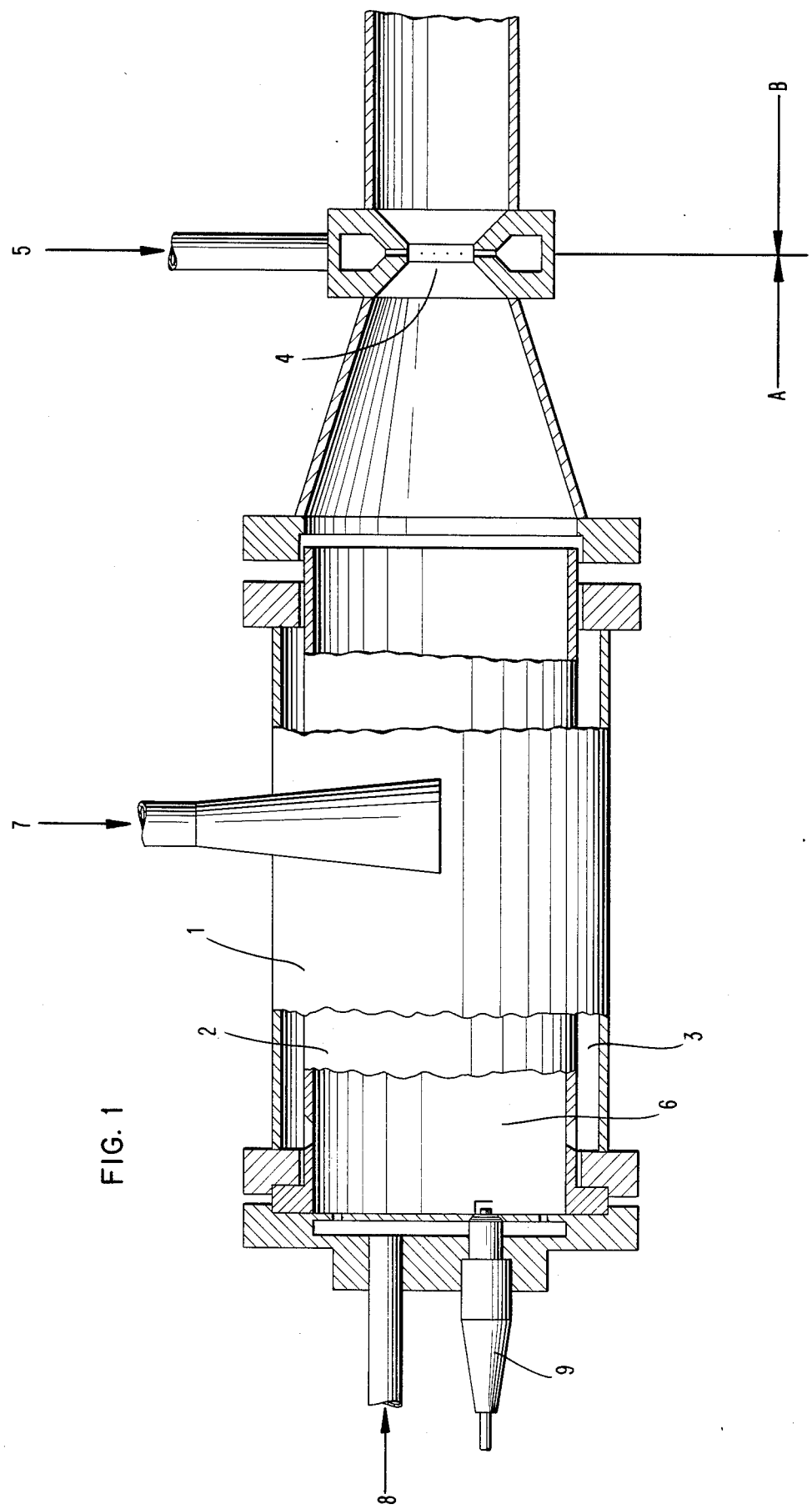
FIG. 1 is an axial diagrammatical view, partially in cross-section, of apparatus suitable for carrying out the invention.

More particularly according to the present invention, in order to prevent the formation of carbon monoxide at a temperature below 800° C., the micro-mixture of the reactants is produced within a period of time which is less than the reaction time that results in the formation of carbon monoxide.

The "carbonaceous source" may comprise carbon dioxide and/or a hydrocarbon such as methane and/or charcoal or coal, and the like.

Other compounds such as steam, nitrogen, etc., may be introduced into the reaction zone A.

In one embodiment according to the invention, a micromixture which is thermally homogenous is produced by effecting in situ combustion by means of oxygen. The fuel may comprise either the hydrogen which is introduced in excess amounts, or a carbonaceous source.

The micro-mixture may be produced by forming a symmetrical helical flow with at least one of the reactants being introduced in gaseous form, and by introducing the other reactants within the region defined by the helical flow.

The combustion of certain carbonaceous sources such as methane being highly exothermic, $CO_2$ may be introduced into the reaction zone A, to perform the function of a thermal diluent, while at the same time carrying out its function in the equilibrium:

$$CO_2 H_2 \rightleftharpoons CO + H_2O$$

Where the $CO_2$ source is not itself capable of supplying sufficient heat in situ, for example, if the $CO_2$ source is $CO_2$ itself, an excess of hydrogen with respect to the $CO_2$ is introduced, that excess being burned in situ.

The cold fluid which is injected into the inlet of the reaction zone B may comprise water which has, on the one hand, the advantage of being a part of the system and, on the other hand, the advantage of providing for the supply of a substantial amount of cold transfer liquid. However, the use of another fluid remains within the ambit of the present invention.

The gas or gases may be pre-heated, at the inlet of the reaction zone A.

It is also envisaged to provide for recycling to the reaction zone A of the $CO_2$ issuing from the reactor.

In accordance with a preferred embodiment of the invention, an axially symmetrical helical flow is formed from at least one of the gaseous reactants, and the other reactant or reactants is introduced into the region defined by the axially symmetrical helical flow. The reaction is initiated by means of suitable firing means, and the reaction medium is subjected to abrupt quenching at the outlet of the axially symmetrical helical flow. Compare, for example, U.S. Pat. Nos. 4,124,353, 4,257,339, 4,263,234, 4,265,702, 4,267,131 and 4,350,101.

Advantageously, if the carbonaceous material comprises $CO_2$, the mixture $CO_2 + H_2$ is used to form the helical phase.

It has unexpectedly been found that the temperature and the composition of the gases issuing from the reaction zone A substantially reflect the values of thermodynamic equilibrium corresponding to the rates of feed to the reaction zone A. That is unexpected because, as above indicated, the rates of change in that equilibrium are reputed to fall to virtually zero below a temperature of 1300° C.

For known technological reasons, it is desirable to use apparatus requiring short residence times, fabricated from materials which are as unsophisticated as possible.

According to the invention, 75% of the equilibrium condition can be attained at a temperature in the range of from 800° to 1300° C. with a residence time of less than 1/1 s and 85% with a residence time of at most 1 sec.

The term residence time in the reaction zone A is intended to denote the quotient of the volume in said reaction zone A times the flow rate in respect of volume under the conditions of temperature and pressure prevailing in that reaction zone.

The expression percentage of equilibrium is used to denote the ratio:

$$100 \times \frac{CO \text{ formed}}{\text{theoretical CO}},$$

with theoretical CO being the amount of CO which would be formed if the conditions of equilibrium were attained under the same temperature conditions in reaction zone A.

The pressure on the gases introduced may be low, lower than $10^5$ Pa. as measured with respect to the pressure attained downstream of the system, when that pressure approximates atmospheric pressure.

However, it is also within the scope of the present invention to use higher pressures in order to operate the reactor under pressure, in particular when, by virtue of an operation which is to be carried out downstream thereof, there is a need for gas under pressure.

One reactor according to the invention may be that illustrated in FIG. 1 of the drawings. Such apparatus comprises a tubular casing 1, a tubular perforated sleeve 2 spaced from said casing 1 and defining an annular interspace 3 therebetween, a convergent wall section terminating in an exit port 4 of reduced cross-section, and defining a zone of restricted flow passage, inlet means 5 for introducing a fluid phase, such as water into the region 4 of restricted flow passage, a reaction chamber 6, at least one tangential inlet 7 which opens into the annular interspace 3, at least one other inlet 8 into said reaction chamber 6 which may or may not be tangential and an ignition or firing means 9, e.g., a sparkplug.

In accordance with the present invention, the mixture $H_2 + CO_2$ is tangentially introduced into the reactor via the conduit 7 such that it forms an axially symmetrical helical flow, after having passed through the perforated sleeve. Oxygen is introduced into the reaction chamber 6 via the feed conduit 8 and water is introduced into the port 4 of restricted flow passage via the feed conduit 5.

The product gases exiting the region B are washed and recovered for subsequent operations.

The composition of the gas mixture issuing from the region B may be regulated in accordance with the intended use thereof and in particular according to whether a synthetic fuel or a synthetic gas is subsequently to be produced. In the former case, the intention is in particular the storage of electrical energy in liquid form, while the second case is concerned with synthetic products.

In order to further illustrate the present invention and the advantages thereof, the following specific examples are given, it being understood that same are intended only as illustrative and in nowise limitative. In said examples to follow, the apparatus employed was that described above and illustrated in the accompanying drawings Also in said examples to follow, the temperatue at the outlet of the region B was 80° C.

EXAMPLE 1

In this Example, which provides a frame of test reference, the operating conditions and results of which are reported in Table I, and wherein the ratio $H_2/CO_2$ was approximately 1 (after substraction of the amount of hydrogen converted into water by the oxygen present).

EXAMPLE 2

This Example, the operating conditions and results of which are reported in Table II, illustrates the influence of residence time in the reaction zone A, same having been reduced by about 35% vis-a-vis the procedure of Example 1.

EXAMPLE 3

This Example, the operating conditions and results of which are reported in Table III, was carried out using a 45% excess amount of $H_2$ with respect to the $CO_2$ (again disregarding any hydrogen converted into water by the oxygen present).

EXAMPLE 4

This Example, the operating conditions and results of which are reported in Table IV, was carried out using a 45% excess amount of $CO_2$ with respect to the $H_2$ (again disregarding any hydrogen converted into water by the oxygen present).

EXAMPLE 5

This Example, the operating conditions and results of which are reported in Table V, was carried out at such lower temperature that the residence time imposed by the apparatus was insufficient to permit attainment of thermodynamic equilibrium.

EXAMPLE 6

Figure 2:
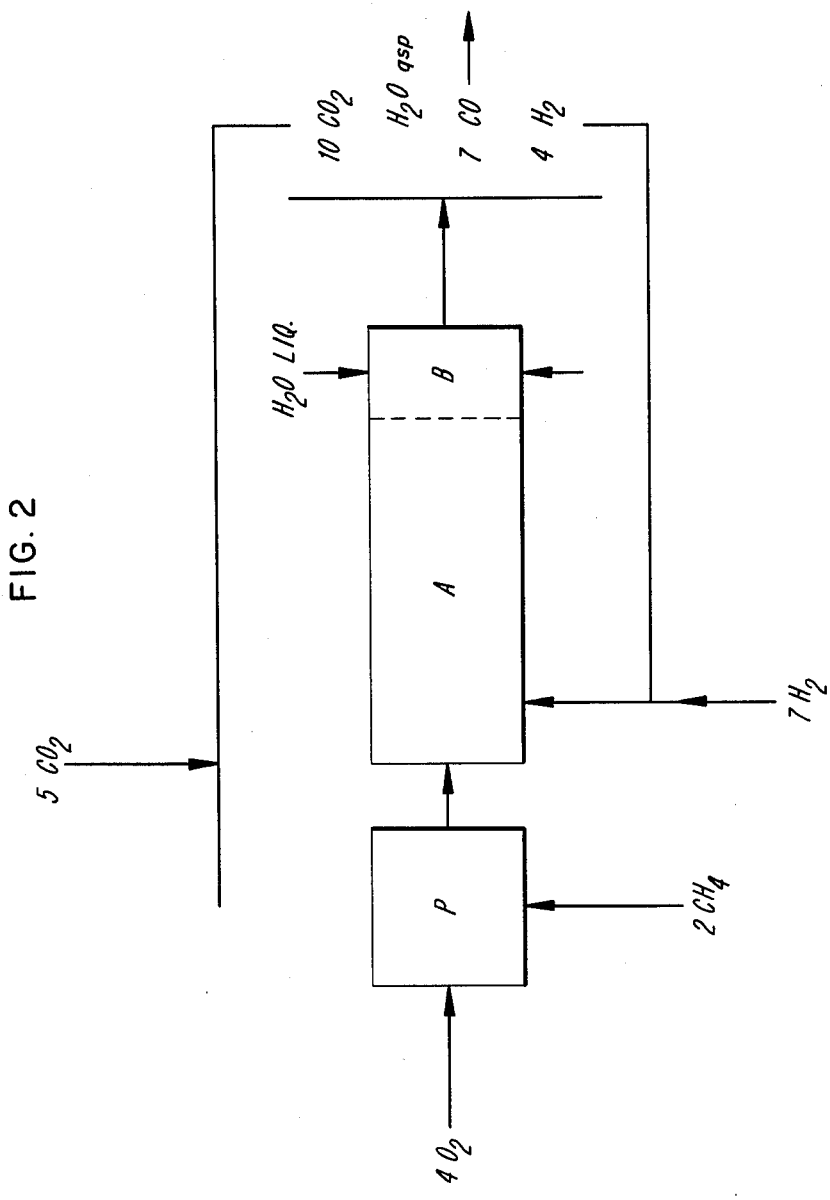
FIG. 2 is a flow sheet of the process according to the invention, as set forth in Example 6 hereof.

This Example was carried out in accordance with FIG. 2, which reflects a theoretical balance sheet, expressed in moles, in which the fuel ($CH_4$) was a $CO_2$ precursor.

Stoichiometric combustion of the fuel was effected in a preliminary reaction zone P at a temperature of 1500° C., with the $CO_2$ functioning as a thermal diluent in said preliminary reaction zone P. The hot gases emanating from said region P ($H_2O + CO_2$) were cycled to the reaction zone A of the apparatus diagrammatically shown in FIG. 1 where they reacted (at 1050° C.) with hydrogen to give the products of the reaction. The gases exiting the region A were subjected to rapid quenching in the region B, from whence they emited in a condition of being saturated with steam (hence the notation "qsp", or "sufficient quantity for").

It will thus be seen that the above Examples illustrate the advantages of the present invention. It is known that synthesis gas has the compositional formula $nCO + mH_2$ and that the values of n and m must be adjusted, depending upon the particular synthesis to be effected therewith. Thus, by way of example:

(i) Conventional Fischer-Tropsch synthesis for engine fuels, n=1 and m=2;

(ii) Modified Fischer-Tropsch synthesis of $C_2$–$C_4$ olefins, n=1 and m=1.5;

(iii) Synthesis of methanol, n=1 and m=2; and (iv) Synthesis of ethylene glycol, n=1 and m=1.5.

The process of the invention makes it possible to readily achieve ratios m/n ranging from 1 to 1.5. For higher ratios (m/n=2), it is sufficient to introduce added hydrogen which is one of the starting gases, the real problem being the reduction of the $CO_2$ In such manner, it is therefore possible, in particular, to provide for "storage" of electrical energy in liquid form.

TABLE I
EXAMPLE 1

| Molar % | Feed | OUTLET Measured after quenching | OUTLET Theoretical before quenching |
|---|---|---|---|
| $H_2$ | 54.5 | 31.3 | 30.3 |
| $CO_2$ | 34.8 | 34.5 | 33.6 |
| $O_2$ | 10.7 | 0.06 | 0.06 |
| $N_2$ | 0.04 | 0.09 | 0.09 |
| CO |  | 34.0 | 35.9 |
| Conversion of $CO_2$ |  | 49.64 | 51.66 |
| % With respect to equilibrium |  | 96.1 |  |
| Theoretical temperature |  | 1260 |  |
| Mean residence time in the region A |  | $1.67 \cdot 10^{-2}$ s |  |
| $H_2$/CO (molar) |  | 0.92 |  |

TABLE II
EXAMPLE 2

| Molar % | Feed | OUTLET Measured after quenching | OUTLET Theoretical before quenching |
|---|---|---|---|
| $H_2$ | 55.6 | 32.5 | 31.7 |
| $CO_2$ | 33.2 | 32.2 | 31.4 |
| $O_2$ | 11.1 | 0.04 | 0.04 |
| $N_2$ | 0.04 | 0.07 | 0.07 |
| CO |  | 35.1 | 36.9 |
| Conversion of $CO_2$ |  | 52.12 | 54.03 |
| % With respect to equilibrium |  | 96.5 |  |
| Theoretical temperature |  | 1334 |  |
| Mean residence time in the region A |  | $1.08 \cdot 10^{-2}$ s |  |
| $H_2$/CO (molar) |  | 0.93 |  |

TABLE III
EXAMPLE 3

| Molar % | Feed | OUTLET Measured after quenching | OUTLET Theoretical before quenching |
|---|---|---|---|
| $H_2$ | 61.2 | 45.3 | 44.5 |
| $CO_2$ | 28.7 | 21.7 | 21.1 |
| $O_2$ | 10.1 | 0.07 | 0.07 |
| $N_2$ | 0.04 | 0.08 | 0.08 |
| CO |  | 32.9 | 34.2 |
| Conversion of $CO_2$ |  | 60.31 | 61.85 |
| % With respect to equilibrium |  | 97.5 |  |
| Theoritical temperature |  | 1226 |  |
| Mean residence time in the regin A |  | $1.63 \cdot 10^{-2}$ s |  |
| $H_2$/CO (molar) |  | 1.38 |  |

TABLE IV
EXAMPLE 4

| Molar % | Feed | OUTLET Measured after quenching | OUTLET Theoretical before quenching |
|---|---|---|---|
| $H_2$ | 48.5 | 22.1 | 20.7 |
| $CO_2$ | 41.2 | 46.9 | 45.4 |
| $O_2$ | 10.2 | 0.04 | 0.04 |
| $N_2$ | 0.06 | 0.11 | 0.11 |
| CO |  | 30.8 | 33.8 |
| Conversion of $CO_2$ |  | 39.66 | 41.46 |
| % With respect to equilibrium |  | 95.2 |  |
| Theoretical temperature |  | 1174 |  |
| Mean residence time in the region A |  | $1.06 \cdot 10^{-2}$ s |  |
| $H_2$/CO (molar) |  | 0.72 |  |

TABLE V
EXAMPLE 5

| Molar % | Feed | OUTLET Measured after quenching | OUTLET Theoretical before quenching |
|---|---|---|---|
| $H_2$ | 57.6 | 45.1 | 41.2 |
| $CO_2$ | 34.3 | 33.6 | 28.8 |
| $O_2$ | 8.0 | 0.04 | 0.05 |
| $N_2$ | 0.05 | 0.09 | 0.09 |
| CO |  | 21.1 | 29.9 |
| Conversion of $CO_2$ |  | 38.62 |  |
| % With respect to equilibrium |  | 75.9 |  |
| Theoretical temperature |  | 932 |  |
| Mean residence time in the region A |  | $2.06 \cdot 10^{-2}$ s |  |
| $H_2$/CO (molar) |  | 2.13 |  |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for converting carbon dioxide into carbon monoxide and water, comprising (a) establishing a thermally homogeneous gaseous admixture medium including carbon dioxide and hydrogen by in situ combustion of a carbonaceous source, hydrogen and oxygen in a first zone A by forming an axially symmetrical helical flow with at least one of the carbonaceous source hydrogen and oxygen in gaseous form and rectilinearly introducing the other of said carbonaceous source, hydrogen and oxygen within said helical flow, the homogeneous gaseous admixture medium being brought to a temperature of at least 800° C. by the heat of in situ combustion within a period of time essentially insufficient for the production of carbon monoxide therefrom;

(b) autogeneously reducing said carbon dioxide under reaction equilibrium conditions to carbon monoxide and water by reaction with the hydrogen, with each molecule of carbon monoxide formed having, or essentially instantaneously being brought to, a temperature of at least 800° C.; and (c) cooling the autogeneous reduction product in a second zone B so as to maintain the reaction equilibrium composition thereof.

2. The process as defined by claim 1, wherein carbon dioxide is introduced during in situ combustion to act as a thermal diluent and to provide additional carbon dioxide in said thermally homogeneous gaseous admixture medium.

3. The process as defined by claim 1, wherein said carbonaceous source comprises carbon dioxide.

4. The process as defined by claim 1, wherein said carbonaceous source comprises a hydrocarbon.

5. The process as defined by claim 1, wherein said carbonaceous source comprises charcoal or coal.

6. The process as defined in claim 1, wherein said in situ combustion is of a carbonaceous source, oxygen and a stoichiometric excess of hydrogen.

7. The process as defined by claim 1, wherein the thermally homogeneous gaseous admixture medium is axially symmetrically and helically flowing downstream in said first zone A of reaction, with combustion being initiated therein by ignition means, and said abrupt cooling being effected at the second zone.

8. The process as defined by claim 1, wherein said thermally homogeneous gaseous admixture medium is brought to a temperature ranging from 800° to 1300° C.

9. The process as defined by claim 1, wherein said abrupt cooling is effected by cocurrent contact with a cold transfer fluid.

10. The process as defined by claim 9, wherein said cold transfer fluid comprises water.

11. The process as defined by claim 1, wherein at least one component of said thermally homogeneous gaseous admixture medium is pre-heated.

12. The process as defined by claim 1, wherein the product of reaction comprises both carbon monoxide and hydrogen.

13. The process as defined by claim 8, wherein at least 75% of reduction reaction equilibrium conditions are established within 110 second.

14. The process as defined by claim 8, wherein at least 85% of reduction reaction equilibrium conditions are established in no more than 1 second.

15. The process as defined by claim 1, wherein said reduction reaction is uncatalyzed.

* * * * *